(12) United States Patent
Miller

(10) Patent No.: US 9,775,329 B1
(45) Date of Patent: Oct. 3, 2017

(54) AUTOMATIC CHICKEN COUP DOOR

(71) Applicant: Elam Miller, Willow Street, PA (US)

(72) Inventor: Elam Miller, Willow Street, PA (US)

( * ) Notice: Subject to any disclaimer, the term of this patent is extended or adjusted under 35 U.S.C. 154(b) by 0 days.

(21) Appl. No.: 14/318,427

(22) Filed: Jun. 27, 2014

(51) Int. Cl.
*A01K 31/02* (2006.01)
*G07C 9/00* (2006.01)
*E05F 15/79* (2015.01)

(52) U.S. Cl.
CPC .............. *A01K 31/02* (2013.01); *E05F 15/79* (2015.01); *G07C 9/00126* (2013.01); *G07C 9/00896* (2013.01)

(58) Field of Classification Search
CPC ..... A01K 31/02; E05F 15/79; G07C 9/00896; G07C 9/00126
USPC ............... 340/5.22, 5.23, 5.28, 5.7, 573.3
See application file for complete search history.

(56) References Cited

U.S. PATENT DOCUMENTS

| | | | | |
|---|---|---|---|---|
| 8,225,458 B1* | 7/2012 | Hoffberg | ............... | E05F 3/102 16/49 |
| 8,854,215 B1* | 10/2014 | Ellis | ............... | E06B 7/32 340/573.1 |
| 2003/0025400 A1* | 2/2003 | Hall | ............... | G04G 15/006 307/134 |
| 2005/0120978 A1* | 6/2005 | Lalor | ............... | A01K 15/023 119/721 |
| 2005/0211796 A1* | 9/2005 | Lovett | ............... | A01M 1/2038 239/332 |
| 2008/0077360 A1* | 3/2008 | DeBoer | ............... | G04C 23/26 702/188 |
| 2011/0113692 A1* | 5/2011 | Stamper | ............... | A01K 31/02 49/334 |
| 2012/0017841 A1* | 1/2012 | Andric | ............... | A01K 31/02 119/416 |
| 2015/0216145 A1* | 8/2015 | Nelson | ............... | A01K 39/0113 119/51.02 |

OTHER PUBLICATIONS

ChickenGuard, www.chickenguard.com.
ADA, www.add-a-motor.com.
Hensafe, www.hensafe.net.
Chuxaway SC, www.chuxaway.com/page14.aspx.
Chuxaway SCX, www.chuxaway.com/page37.aspx.
VSB, www.chicken-house.co.uk/acatalog/VSBb_Automatic_Door_Opener.html.
Titon, www.amazon.co.uk/Automatic-Chicken-House-Opener-Sensor/dp/B00GGNIQLA.

* cited by examiner

*Primary Examiner* — Thomas Alunkal
(74) *Attorney, Agent, or Firm* — Quickpatents, LLC; Kevin Prince

(57) ABSTRACT

An automatic drive unit for a door assembly of the type having a frame with an opening, a door positionable within the opening between an open position and a closed position, and a door actuator for moving the door between the open and closed positions, includes a controller circuit having a power source, a timing circuit for reporting the date and time to a processor, a non-volatile memory, a programmed set of instructions, and a display. The programmed set of instructions are adapted for receiving input of a location and open and close offset times, and storing such information in the memory. The controller circuit executing the instructions determines based on its location and the date a sunrise time and a sunset time, opens the door at the sunrise time plus the open offset time, and closes the door at the sunset time plus the close offset time.

16 Claims, 6 Drawing Sheets

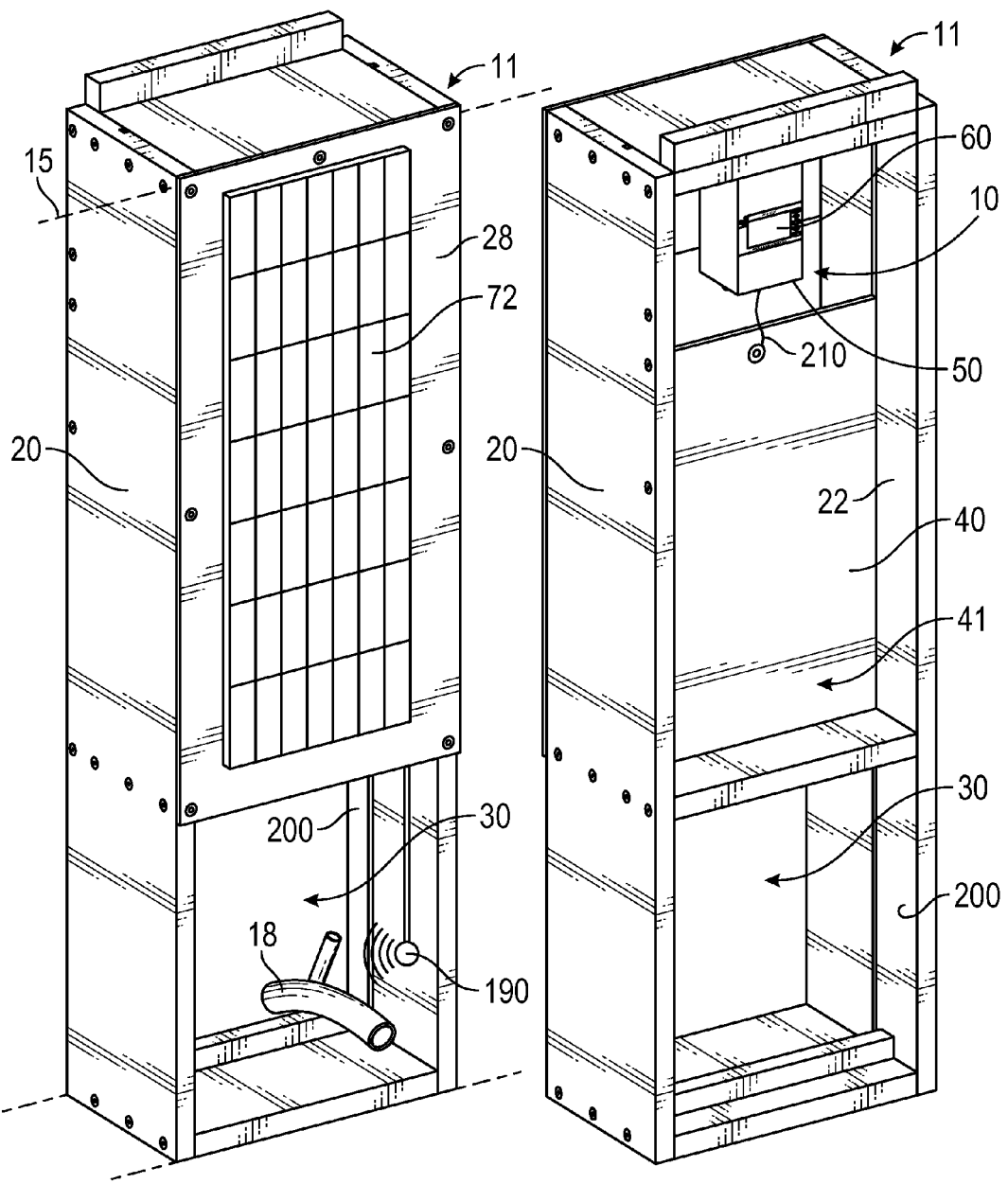

AUTOMATIC CHICKEN COUP DOOR

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to animal husbandry, and more particularly to an improved chicken coup door.

DISCUSSION OF RELATED ART

There is an increased interest in raising chickens and other animals at local organic farms and even in suburban and rural settings. Several companies manufacture and install animal doors for entry and exit. Other companies manufacture electro-mechanical devices for opening and closing a door panel automatically. The electro-mechanical devices currently being marketed and used for this application are typically opened and closed in the following ways: 1) Manually activated by pressing an up or down button; 2) timer activated by setting a timer to open or close the door at designated times; or 3) light sensor-activated when ambient light reaches a preset brightness and closing the device when ambient light levels fall below a preset brightness.

Commercial products that function in the above manner for animal doors and that are sold over the Internet include:
a) ChickenGuard, www.chickenguard.com (Timer, Light Sensor, Manual)
b) ADA, www.add-a-motor.com (Timer, Manual)
c) Hensafe, www.hensafe.net (Timer, Light Sensor, Manual)
d) Chuxaway SC, www.chuxaway.com/page14.aspx (Timer, Manual)
e) Chuxaway SCX, www.chuxaway.com/page37.aspx (Timer, Manual)
f) VSB, www.chicken-house.co.uk/acatalogNSBb Automatic Door Opener.html (Light sensor, Manual)
g) Titon, www.amazon.co.uk/Automatic-Chicken-House-Opener-Sensor/dp/B00GGNIQLA (Timer, Manual)

Manually activated devices require a person to be next to the device to set the device in an opened or closed position. Timer-activated devices do not require a person to be physically next to the device to activate it; however, timer-based devices often have complex methods of setting the timer; the correct time may be lost in the event of a power outage (if time is not stored in fixed memory); and the time setting must be frequently changed as available daylight becomes longer or shorter over the course of the year.

Light sensor activated devices attempt to solve the drawbacks with timer-based devices by activating the door based on the amount of light. However, such devices are often not functional in the automatic door application for animals because electric door openers are preferably mounted on the inside of a coup or enclosure to protect such a device from the elements. While a device mounted inside usually also has light for trouble-shooting a problem at night, and also provides protection from bad weather and cold temperatures, such devices often do not function correctly because they do not have sufficient sensitivity to distinguish between sunlight and electric light fixtures when mounted inside the coup. Additionally, egg yield can often be artificially increased by increasing the amount of artificial light animals are exposed to. Therefore light sensors mounted indoors are often ineffective in this instance. Further, it is also possible, in colder parts of the world, to use heat lights for additional warmth. Again, such heat lights often adversely interact with light sensors on automatic doors. If mounted on the outside of a coop or enclosure, the light sensor is often activated by artificial sources of light such as headlights, pool lights, spot lights and dense clouds.

The failure of an automatic door opener to reliably open when it is light and close when it is dark is a particularly severe problem when housing poultry and certain other animals that must be indoors at night time to protect them from predators such as foxes and coyotes that forage at night. Poultry, in particular, instinctively seek safe haven from predators when it is dark and an enclosed coop with a door that reliably closes is such a safe haven.

Therefore, there is a need for a device that automatically and reliably actuates a door opener/closer at a desired time with respect to sunrise and sunset for any particular location. Such a needed device would function once a location is either set, or would determine its own location and local time by utilizing GPS technology. Such a needed invention would be relatively simple to manufacture, install and use. The present invention accomplishes these objectives.

SUMMARY OF THE INVENTION

The present device is an automatic drive unit for a door assembly of the type having a frame with an opening, a door positionable within the opening between an open position and a closed position, and a door actuator fixed with the frame and adapted for moving the door between the open and closed positions.

By way of example, such a door assembly may be of the type for use with a chicken coup, a pet door for allowing a pet ingress and egress from a house, or the like.

The automatic drive unit of the present invention comprises a controller circuit that includes at least a power source, a timing circuit for reporting the date and time to a processor, a non-volatile memory, a programmed set of instructions, and a display. In one embodiment, the power source is a wall outlet for receiving power from a utility line. Alternately the power source may be at least one battery, or at least one rechargeable battery in conjunction with at least one solar cell that is adapted to recharge the at least one rechargeable battery.

The programmed set of instructions are adapted for receiving input of a location, such as a US zip code or latitude/longitude coordinates, an open offset time, and a closed offset time, and storing such information in the memory. The controller circuit executing the instructions determines based on the location and the date a sunrise time and a sunset time, opens the door at the sunrise time plus the open offset time, and closes the door at the sunset time plus the close offset time.

Preferably the controller circuit further includes a user input device for allowing a user to enter the open offset time and the closed offset time thereby. Such an offset time, may be within the range of plus-or-minus 15 hours, including zero, for example.

In one embodiment of the invention, the user input device is further used to set a time and date in the controller circuit, wherein the timing circuit maintains the current time and date in the memory. Alternately, the controller circuit further includes a GPS circuit adapted for receiving the time and the location of the automatic drive unit from a plurality of GPS satellites. In such an embodiment, the GPS circuit incorporates the timing circuit and is adapted to report the location of the automatic drive unit to the controller circuit. The memory may include a look-up table that includes a location and a date as an input, and sunrise and sunset times, as outputs.

Preferably the controller circuit further includes at least a first running mode corresponding to opening and closing the door based on the sunrise and sunset times, plus the offset times, respectively; a second running mode corresponding to opening the door at a set open time and closing the door at a set close time, the open and close times being set by the user input device and stored in the memory by the controller circuit; and a third running mode corresponding to a manual operation of the door, wherein pressing an open button of the user input device opens the door, and pressing a close button of the user input device closes the door. Further, a calibrate mode may be included for setting the maximum downward travel of the door representing the closed position and the maximum upward travel of the door representing the open position. Still further, a clock set mode may be included for setting a clock of the timing circuit in the embodiment not having the GPS circuit.

In use, the controller circuit receives an input of its location, such as from the GPS circuit, user input device, or other means such as cellular tower triangulation, or the like. Further, a desired open offset time and closed offset time may be preprogrammed during manufacture or reprogrammed by the user using the user input device. The location and offset times, are stored in the memory by the controller circuit, utilizing the processor. Thereafter the controller circuit may determine based on the location and the date reported by the timing circuit the sunrise time and the sunset time. The controller circuit then opens the door at the sunrise time plus the open offset time, and closes the door at the sunset time plus the close offset time. In the embodiment having the obstruction sensor, if an obstruction blocks the door from closing the controller circuit does not allow the actuation of the door actuator to close the door.

The present invention is a device that automatically and reliably actuates a door actuator at a desired time with respect to sunrise and sunset at any particular location. The present device works reliably once a location is either set manually in a memory of the device, or after determining its own location and local time by utilizing GPS technology. The present invention is relatively simple to manufacture, install and use. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a front perspective view of the invention, illustrated with a door thereof in an open but obstructed position;

FIG. 2 is a rear perspective view of the invention, illustrated with the door in an open, unobstructed position;

DETAILED DESCRIPTION OF THE PREFERRED EMBODIMENT

Figure 3:
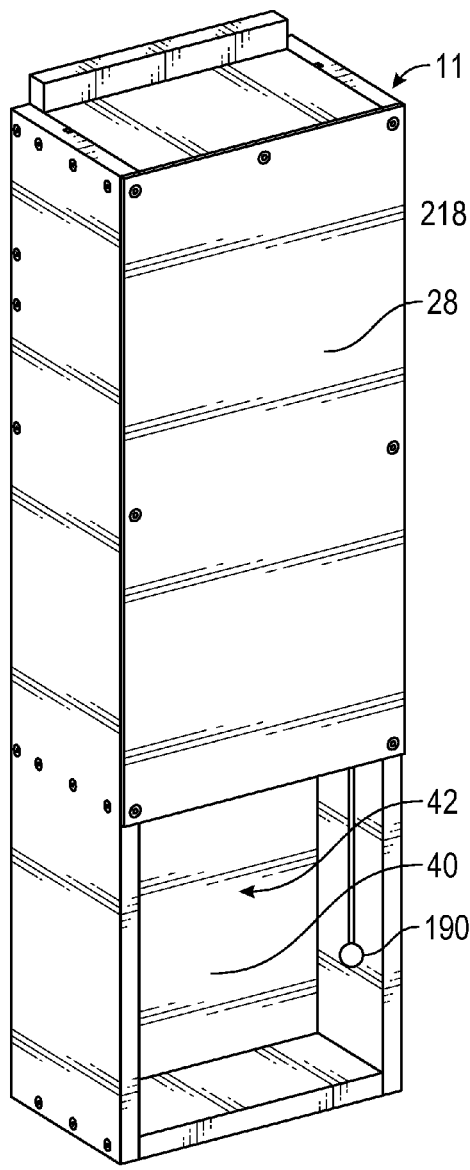
FIG. 3 is a front perspective view of the invention, illustrated with the door in a closed position.
Figure 4:
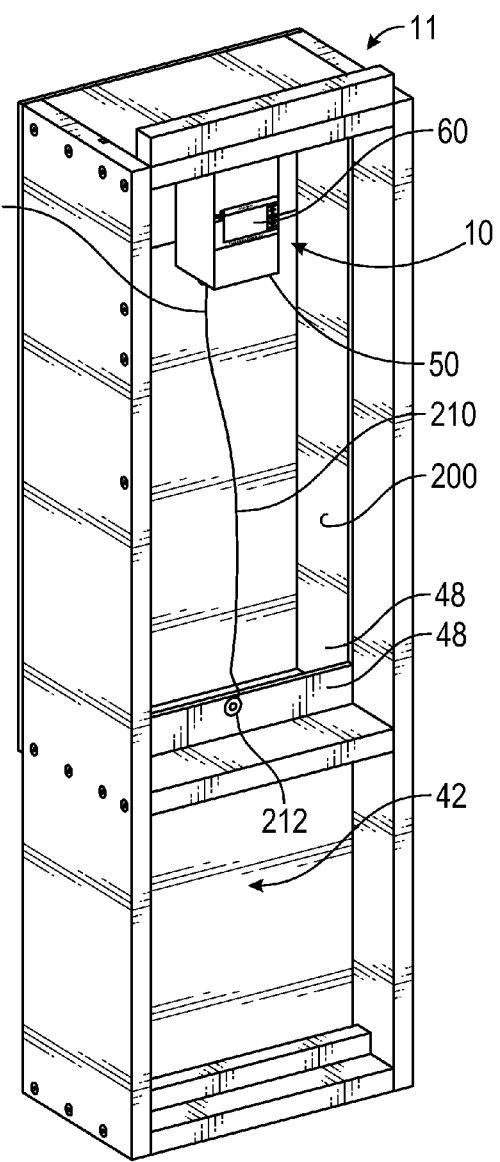
FIG. 4 is a rear perspective view of FIG. 3.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 illustrate an automatic drive unit 10 for a door assembly 11 of the type having a frame 20 with an opening 30, a door 40 positionable within the opening between an open position 41 and a closed position 42, and a door actuator 50 fixed with the frame 20 and adapted for moving the door 40 between the open and closed positions 41,42.

By way of example, such a door assembly 11 may be of the type for use with a chicken coup 15 (FIG. 1), a pet door (not shown) for allowing a pet ingress and egress from a house, or the like. The frame 20 may include an external side 28 and an internal side 22, as well as a vertical track 200 for receiving the door 40 in slidable engagement therewith. In such a door assembly 11, the door actuator 50 may be of the typing that includes a flexible linkage 210 fixed at one end 212 thereof with a top end 48 of the door 40, an opposing 218 end thereof fixed with a spool 220 of an electric motor 230. As such, the flexible linkage 210, such as a rope or chain, is fully extended off of the spool 220 when the door 40 is in the closed position 42, and is fully wound upon the spool 220 to hold up the door 40 when the door 40 is in the open position 150. Clearly, however, other door and door actuator arrangements can be accommodated within the spirit and scope of the present invention. For example, the door 40 may pivot between the open and closed positions 150,160.

The automatic drive unit 10 of the present invention comprises a controller circuit 60 (FIG. 6) that includes at least a power source 70, a timing circuit 80 for reporting the date and time to a processor 90, a non-volatile memory 100, a programmed set of instructions 110, and a display 120

Figure 5:
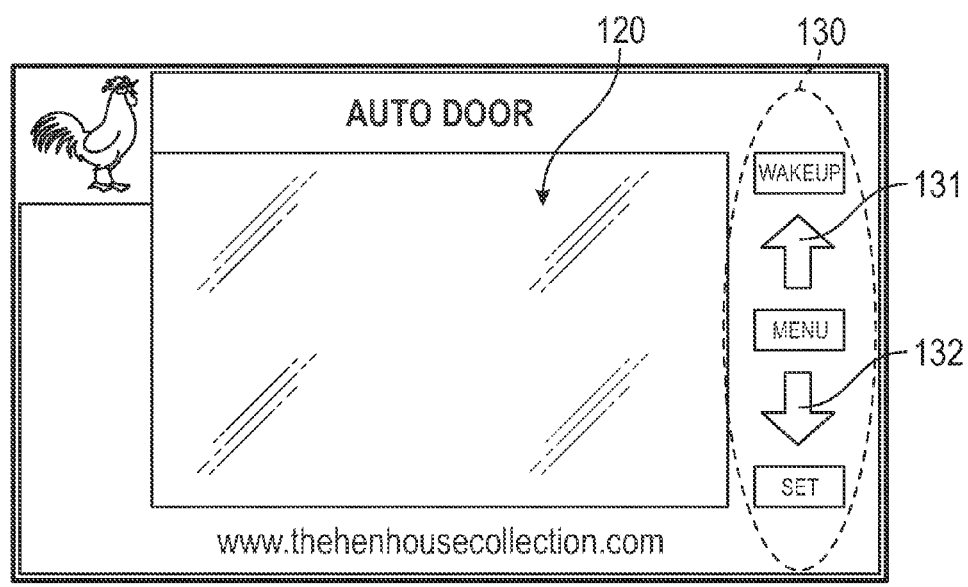
FIG. 5 is a user input device and a display screen of the invention.

(FIG. 5). In one embodiment, the power source 70 is a wall outlet (not shown) for receiving power from a utility line. Alternately the power source 70 may be at least one battery 71, or at least one rechargeable battery 71 in conjunction with at least one solar cell 72 (FIG. 1) that is adapted to recharge the at least one rechargeable battery 71.

Figures 6, 7:
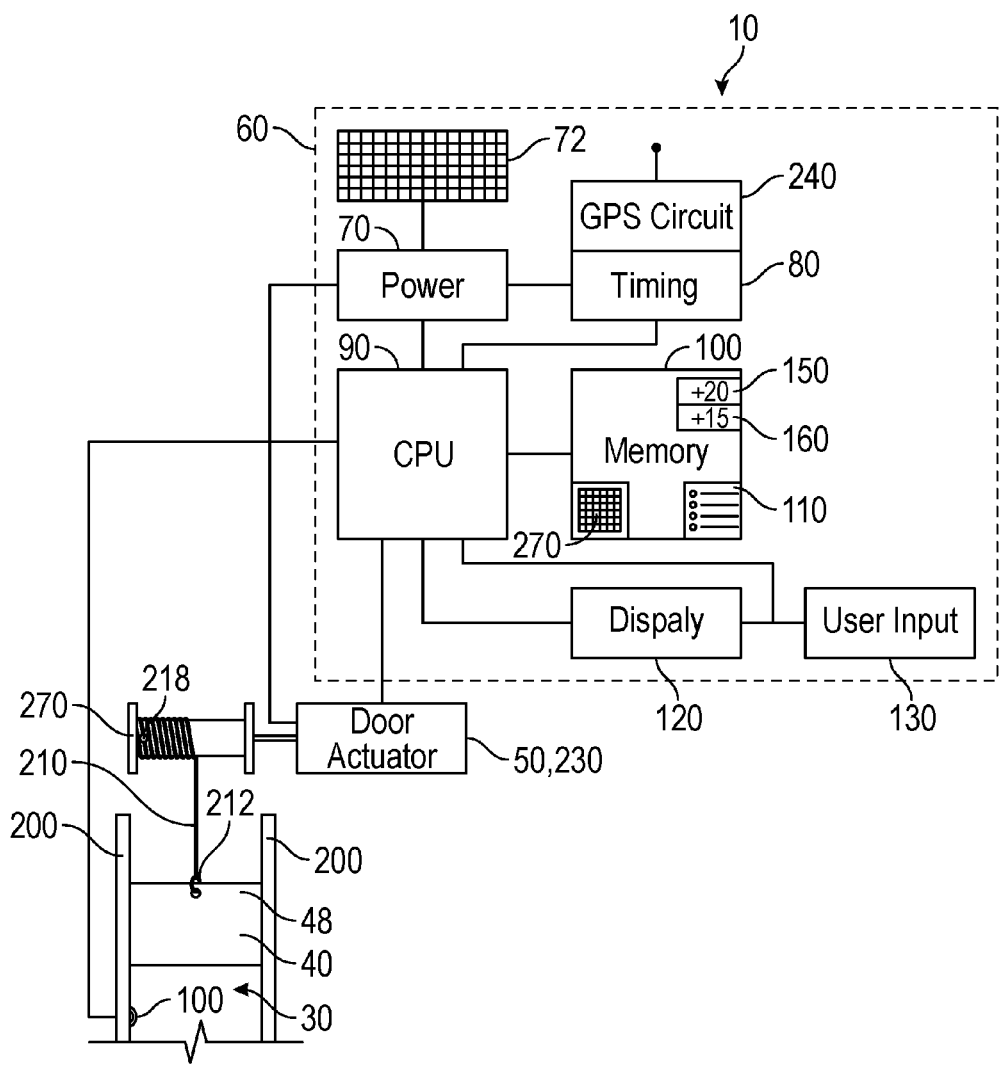
FIG. 6 is a block diagram of the invention.
FIG. 7 is a diagram of a look-up table in a memory of the device.
Figure 8A:
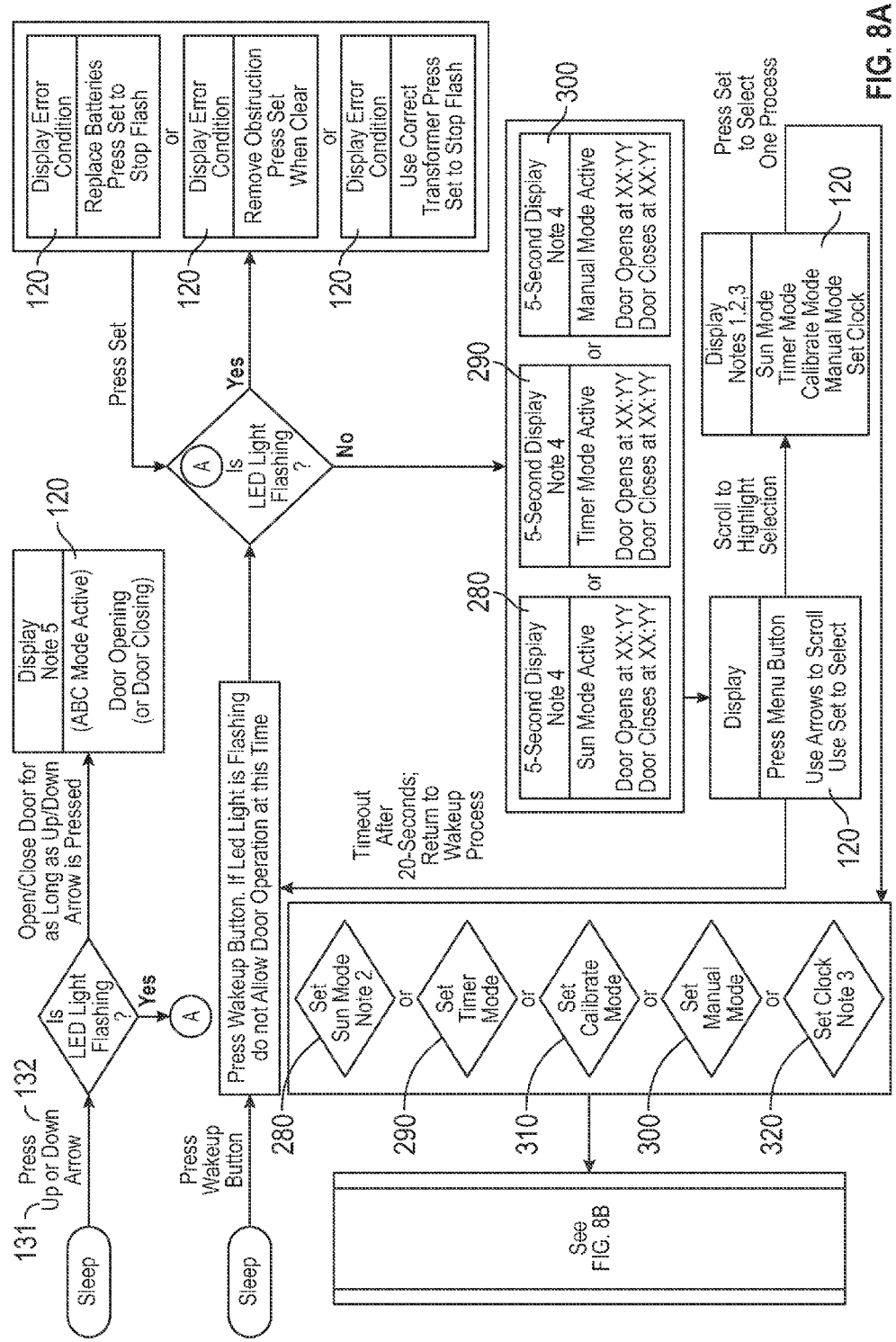
FIG. 8A is a first part of a flow diagram detailing a set of programmed instructions of the controller circuit.
Figure 8B:
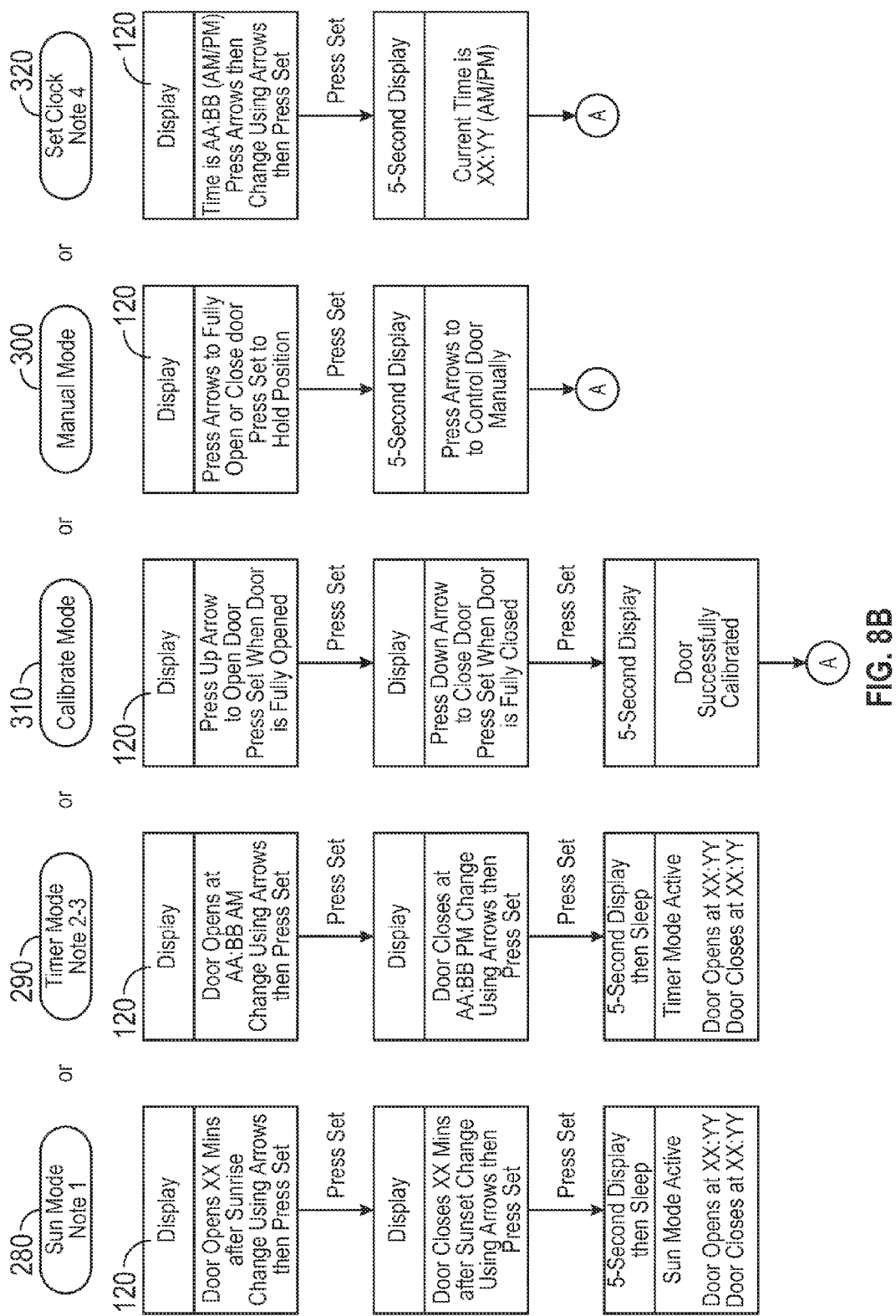
FIG. 8B is a second part of the flow diagram detailing the set of programmed instructions of the controller circuit.

The programmed set of instructions 110 (FIGS. 8A and 8B) are adapted for receiving input of a location 140, such as a US zip code 250 or latitude/longitude coordinates 260, an open offset time 150, and a closed offset time 160, and storing such information in the memory 100 (FIG. 7). The controller circuit 60 executing the instructions 110 determines based on the location 140 and the date a sunrise time 170 and a sunset time 180, opens the door 40 at the sunrise time 170 plus the open offset time 150, and closes the door 40 at the sunset time 180 plus the close offset time 160.

Preferably the controller circuit 60 further includes a user input device 130 (FIG. 5) for allowing a user (not shown) to enter the open offset time 150 and the closed offset time 160 thereby. Such an offset time 150,160 may be within the range of +/−15 hours, including zero, for example.

In one embodiment of the invention, the user input device 130 is further used to set a time and date in the controller circuit 60, wherein the timing circuit 80 maintains the current time and date in the memory 100. Alternately, the controller circuit 60 further includes a GPS circuit 240 adapted for receiving the time and the location of the automatic drive unit 10 from a plurality of GPS satellites (not shown). In such an embodiment, the GPS circuit 240 incorporates the timing circuit 80 and is adapted to report the location of the automatic drive unit 10 to the controller circuit 60. The memory 100 may include a look-up table 270 that includes a location 140 and a date as an input, and sunrise and sunset times 170,180 as outputs (FIG. 7). Alternately the controller circuit 60 may include a receiver circuit (not shown) for receiving the NIST radio station WWVB time code transmission broadcast near Fort Collins, Colo.

Preferably the controller circuit 60 further includes at least a first running mode 280 corresponding to opening and closing the door 40 based on the sunrise and sunset times 170,180, plus the offset times 150,160, respectively; a second running mode 290 corresponding to opening the door 40 at a set open time and closing the door at a set close time (FIG. 8B), the open and close times being set by the user input device 130 and stored in the memory 100 by the controller circuit 60; and a third running mode 300 corresponding to a manual operation of the door 40, wherein pressing an open button 131 (FIG. 5) of the user input device 130 opens the door 40, and pressing a close button 132 of the user input device 130 closes the door 40. Further, a calibrate mode 310 may be included for setting the maximum downward travel of the door 40 representing the closed position 42 and the maximum upward travel of the door 40 representing the open position 41. Still further, a clock set mode 320 may be included for setting a clock of the timing circuit 80 in the embodiment not having the GPS circuit 240.

In use, the controller circuit 60 receives an input of its location 140, such as from the GPS circuit 240, user input device 130, or other means such as cellular tower triangulation, or the like. Further, a desired open offset time 150 and closed offset time 160 may be preprogrammed during manufacture or reprogrammed by the user using the user input device 130. The location 140 and offset times 150,160 are stored in the memory 100 by the controller circuit, utilizing the processor 90. Thereafter the controller circuit may determine based on the location 140 and the date reported by the timing circuit 80 the sunrise time 170 and the sunset time 180. The controller circuit then opens the door 40 at the sunrise time 170 plus the open offset time 150, and closes the door 40 at the sunset time 180 plus the close offset time 160. In the embodiment having the obstruction sensor 190, if an obstruction 18 blocks the door 40 from closing the controller circuit 60 does not allow the actuation of the door actuator 50 to close the door 40.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An automatic drive unit for a door assembly of the type having a frame with an opening, a door positionable within the opening between an open and a closed position, and a door actuator fixed with the frame and adapted for moving the door between the open and closed positions, the automatic drive unit comprising:

a controller circuit that includes, at least, the following:
        a power source;
        a timing circuit having a means for reporting a current date and time;
        a processor;
        a non-volatile memory;
        a display; and
        a programmed set of instructions adapted for receiving input of a location signally, an open offset time, and a closed offset time, and further adapted for storing the location and offset times in the memory, whereupon said programmed set of instructions is enabled to make a determination, based on the location and the date, of a sunrise time and sunset time for the current date;
        whereby, the door is opened at sunrise plus the open offset time and closed at sunset plus the close offset time for an indefinite future without the need for human control.

2. The automatic drive unit of claim 1 wherein the controller circuit further includes a user input device, the controller circuit further adapted to receive the open offset time and the closed offset time from the user input device.

3. The automatic drive unit of claim 2 wherein the controller circuit is further adapted to receive the time and date from the user input device, and the timing circuit is adapted to maintain the current time and date in the memory.

4. The automatic drive unit of claim 1 wherein the controller circuit further includes an obstruction sensor fixed proximate the door, the controller circuit preventing the door actuator from closing the door when the obstruction sensor detects an obstruction proximate the door.

5. The automatic drive unit of claim 1 wherein the power source includes at least one replaceable battery.

6. The automatic drive unit of claim 1 wherein the power source includes at least one rechargeable battery and wherein the automatic drive unit further includes at least one solar cell adapted to recharge the at least one rechargeable battery.

7. The automatic drive unit of claim 1 wherein the controller circuit further includes a GPS circuit adapted for receiving the time at the location of the automatic drive unit from a plurality of GPS satellites, the GPS circuit incorporating the timing circuit and the adapted to report the location of the GPS circuit to the controller circuit.

8. The automatic drive unit of claim 2 wherein the controller circuit is further adapted to receive the location from the user input device in the form of a US Zip Code.

9. The automatic drive unit of claim 2 wherein the controller circuit is further adapted to receive the location from the user input device in the form of latitude and longitude coordinates.

10. The automatic drive unit of claim 1 wherein the memory includes a look-up table that includes locations and dates as an inputs, and sunrise and sunset times as outputs.

11. The automatic drive unit of claim 2 wherein the controller circuit further includes at least three running modes, the first running mode corresponding to opening and closing the door based on the sunrise and sunset times, plus the offset times, the second running mode corresponding to opening the door at a set open time and closing the door at a set close time, the open and close times being obtained from the user input device, and the third running mode corresponding to a manual mode wherein pressing an open button of the user input device opens the door, and pressing a close button of the user input device closes the door.

12. A method of opening and closing a door assembly of the type having a frame with an opening and a door positionable within the opening between an open and a closed position; a door actuator fixed with the frame and adapted for moving the door between the open and closed positions; and a controller circuit that includes at least the following: a power source; a timing circuit having a means for reporting a current date and time; a processor; a non-volatile memory; a programmed set of instructions adapted for receiving input of a location, an open offset time, and a closed offset time, and further adapted for storing the location and offset times in the memory; a display; and a user input device; the method comprising the steps:

a) receiving an input of a location, an open offset time, and a closed offset time;
    b) storing the location and offset times in the memory;
    c) determining based on the location and date a precise sunrise time and a precise sunset time for that date;
    d) opening the door at sunrise plus the open offset time for an indefinite future without the need for human control; and
    e) closing the door at sunset plus the close offset time also for an indefinite future without the need for human control.

13. The method of claim 12 wherein step e) is replaced with e) closing the door at sunset plus the close offset time, unless an obstruction sensor fixed proximate the door and connected with the control circuit detects an obstruction proximate the door.

14. The method of claim 12 wherein step a) is replaced with a) receiving the date and time and an input of a location from a GPS circuit of the automatic drive unit, an open offset time from the user input device, and a closed offset time from the user input device.

15. The method of claim 12 wherein step a) is replaced with a) receiving an input of a location in the form of a zip code from the user input device, an open offset time from the user input device, and a closed offset time from the user input device.

16. The method of claim 12 wherein step a) is replaced with a) receiving an input of a location in the form of longitude and latitude coordinates from the user input device, an open offset time from the user input device, and a closed offset time from the user input device.

* * * * *